Patented Sept. 18, 1945

2,384,825

UNITED STATES PATENT OFFICE 2,384,825

METHOD OF SEPARATING QUARTZ SAND FROM PHOSPHATE ROCK

Edward J. Ellis, Bartow, Fla., assignor to Southern Phosphate Corporation, Baltimore, Md., a corporation of Delaware No Drawing. Application May 13, 1938, Serial No. 207,848

13 Claims. (Cl. 209—3)

My invention relates to a method of separating sand, slimes and the like from phosphate rock and is particularly applicable to Florida pebble phosphate washery waste, a low grade phosphatic material locally known as "debris" or "recovery plant feed." This material consists mainly of quartz sand, together with smaller amounts of finely divided phosphate rock (B. P. L.), clay and slime. Debris comprises the fines rejected by the washery plants employed to separate the larger phosphate particles from the raw ore. In such plants the ore matrix is broken up and passed through washers, sizers and classifiers of various types. This procedure removes from the ore most particles larger in size than plus 20 mesh, and most particles ranging downwardly from minus 100 mesh including most of the free slimes that naturally occur in the ore. The free slimes are removed by the washing and rejected with the wash water. Such slime, being present in the ore in a free state and removable by washing alone, may be termed "primary" slime. The portion of the ore rejected as debris contains a very reduced percentage of the free or primary slimes. The phosphate particles, however, carry coatings of soft slime-forming material that readily breaks down to form free slimes in the debris. This phosphate particle-carried slime-forming material may be termed "secondary" slime. Hereinafter the term "debris" is used as embracing washery waste from which primary slimes have been removed by the preliminary desliming performed as an incident to the standard washery practice applied to phosphate ores. By "slime" is meant extremely fine particles of clay or phosphate in semi-colloidal suspension. The proportion of the constituents may vary as follows: phosphate rock 15–35%; sand 80–50%; and slime 0.5–5.0%. The name "recovery plant feed" also has been applied to this material because such material has been the usual feed to recovery plants operating by flotation of the phosphate from the gangue after conditioning with selective agents, as soaps of fatty acids. It is hereinafter referred to as either "debris" or "feed." It having been discovered that the quartz sand in debris can be floated off from the phosphate particles by means of silica promoters, of the so-called "cationic" type, I have made discoveries, hereinafter disclosed, which greatly improve the results obtainable by the use of such reagents.

In general, most of the cationic reagents are complex organic compounds containing nitrogen, in which the nitrogen atom is the nucleus of the molecule. Around the nucleus is grouped from one to four, more or less complex organic radicals which may replace a similar number of hydrogen atoms. To the nitrogen nucleus is also attached a short acid radical or single atom which splits off as a negative ion in water, leaving the nitrogen with its surrounding grouping as a basic ion or cation. From this latter word the reagents take their name as a group.

These cations are readily abstracted from solution in water by solids in a pulp of phosphate debris in water with which such ions come in contact. Slime, including phosphate slime, and quartz will abstract these cations from solution in water more readily than phosphate particles and in the order given.

After a quartz particle has been coated over with a film of cations of the cationic reagent, as proposed heretofore, its surface becomes water-repellent. If finally disseminated air bubbles are present in a system in water of such coated quartz particles and other particles not so coated, the quartz particles tend to be gathered into more or less loosely bonded agglomerates. Such a system may then be separated into coated and uncoated components in conventional types of flotation cells. Owing to the nature of phosphate debris, it is impossible to eliminate all slime from a pulp of the same in water. Hence, when phosphate debris is treated with cationic reagents as proposed heretofore, the slime abstracts the cationic reagent from solution first and leaves the quartz unfloated or causes excessive consumption of cationic reagent. I have discovered that a relatively small amount of cheap petroleum fuel oil introduced with the cationic reagent will oil the quartz and reduce the amount of cationic reagent necessary to effect a complete separation and will also effect the separation of a somewhat coarser quartz particle. In the absence of a cationic reagent, the fuel oil will not oil the quartz.

All the cationic reagents that have been employed by me for separating quartz from phosphate rock are manufactured products, distributed under trade-names. All of these trade-named compounds exhibit, to a greater or less degree, cationic tendencies to float quartz.

Flotation of quartz from Florida phosphate rock can be effected by the use of cationic reagents alone if the raw material is sufficiently fine. Such separation encounters several hindering factors, which are as follows:

1. Slime interference

Any slime present in a mixture of particles of phosphate rock and quartz sand either as free, primary or secondary slimes has been found to consume the cationic reagents before any quartz can be induced to float.

2. Quartz size limit

In order to make a separation of quartz from phosphate rock by flotation using cationic reagents alone to float the quartz, it has been found that the quartz must not be coarser than about 65 mesh (.0082 inch) in size. If quartz coarser than this size is present, most of it will be left in the unfloated portion. If the material to which such a separation would be applied contains much quartz coarser than 65 mesh, it is impossible to make a separation of such a degree as to leave an unfloated product sufficiently free of quartz to be marketable. In order to make such a separation possible, it would be necessary to grind the entire bulk to about 65 mesh. This would entail much expense and a large loss of phosphate as slime.

I have discovered that quartz can be separated satisfactorily from phosphate rock of the character herein described if the raw debris is first deslimed, and the deslimed feed then mixed with an emulsion of petroleum fuel oil, water and a cationic reagent, before concentration by flotation.

It has been proposed heretofore to separate phosphate rock from sand by treating the pulp with a selective agglomerating agent that will agglomerate and coat the phosphate particles, leaving the sand behind. Where the raw material is high in sand as herein, difficulties are encountered when an attempt is made to separate the phosphate agglomerates on a shaking table, with a high output. The sand collects in the riffles and, if the rate of feed is high, soon fills up the space between the riffles and then floats over, transversely of the riffles, with the phosphates. Where the floated material constitutes the larger proportion of the two parts, as when floating the sand from a low grade feed, across the riffles, the output of the shaking table can be high and still secure efficient and clean separation. By floating the sand with the selective reagents rather than the phosphates, the phosphates are recovered in a clean condition, which is a distinct advantage in some uses to which the phosphate is put.

My process, as applied to the separation of quartz from Florida phosphate rock may be outlined as follows:

The debris is thoroughly deslimed, not only of free slimes, but also of secondary slime, being soft, easily slimed material that might later break down in handling or treating. This can be done without a great loss in phosphate slime by mechanical agitation or churning so as to cause sliming of the soft particles between the harder particles by attrition. The agitator may be an impeller type mixer with a vertical shaft, or a cylindrical type mixer revolving about a horizontal axis, or a horizontal trough type mixer with one or more horizontal or slightly inclined shafts to which mixing blades are attached. The effect of such agitation is to polish the secondary slimes from the phosphate particles.

With the deslimed feed is then mixed an emulsion of petroleum fuel oil, water and a promoter for silica, such promoter being cationic reagent, to produce a relatively thick pulp in water. The mixing period of feed, oil, water and cationic reagent may vary from thirty seconds to five minutes, depending upon the violence of the agitation and the density of the pulp. This mixing causes the quartz to be collected into oily agglomerates.

The agglomerated quartz may then be separated from the phosphate rock by a flotation treatment dependent for separation upon altered characteristics of the surface of the particles, either in flotation cells or on shaking tables. In either case, the quartz is floated away from the phosphate. When flotation cells are used, the agglomerated quartz collects in the froth, while if a table is used, it is floated in and on the water flowing across the riffles and over the side of the table.

If, after one run over tables or through a series of flotation cells, too much quartz remains in the unfloated portion, it may be reconditioned in the same way, with more of the same reagents, and given a second run. This may be repeated as often as is profitable to do so until a satisfactory separation is obtained. After the pulp has been treated first with froth flotation and too much quartz remains in the unfloated portion, particularly quartz of a size not amenable to further froth flotation separation, this material may be treated further on the shaking table, reconditioning the same if necessary.

In some cases, it has been found that chemical reagents, such as mineral acids, caustic alkalies or some salts of acid reaction, aid in the preliminary desliming step. These are not necessary, but they speed up desliming. Also with some cationic reagents, less of the reagent is required to effect agglomeration if the pH value of the pulp is regulated thereafter by the addition of small quantities of neutralizing acidic or basic reagents, as the need requires, to adjust the pH to near the neutral point, which is about 6.5–7.5.

The cationic reagents that I employ are manufactured by E. I. du Pont de Nemours & Co., and are offered by the manufacturer under the trade-names of: (1) "La Retarder" or "Reagent Q," (2) "Duponal BC," (3) "DP 243" (lauryl amine hydrochloride containing other amines of higher and lower alcohols) and (4) "Product QB."

Other products that can be similarly used and substituted for the above are manufactured by the Society of Chemical Industry in Basle, Switzerland, and are sold under the trade-names of: "Sapamine KW," "Sapamine CH," "Sapamine MS" and "Lyofix DE." In general "Sapamine" may be defined as a higher fatty-acid N-carboxyl ester of symmetrically substituted ethylenediamines; as, diethylaminoethyloleamide. Specifically, "Sapamine KW" is diethylaminoethylstearylamide hydroacetate. The other two "Sapamine" reagents are similar quaternary salts. "Lyofix" is a quaternary salt of an organic base having a range of $C_{12}H_{26}$ or higher.

The exact compositions of the other trade-named reagents are unknown to me at present, but are known to contain quaternary ammonium salts.

As indicating the effectiveness of desliming before treatment, the following examples may be given by way of illustration:

Example 1

A sample of the debris, i. e. recovery plant feed obtained from the washery, without additional desliming was agitated in a thick pulp in water with 4 lbs. of du Pont's "La Retarder" and 2 lbs. of petroleum fuel oil, both per ton of dry feed present, and fed over a Deister-Overstrom shaking table without desliming. The portion containing the bulk of the quartz floated over the tailing side of the table, while the portion containing the bulk of the phosphate rock was discharged over the concentrate end.

*Results, Example 1*

| Products | Weight | Assays | | Distribution | |
|---|---|---|---|---|---|
| | | B. P. L. | Insol. silica | B. P. L. | Insol. |
| Floated_____percent__ | 67.5 | 7.95 | 89.26 | 22.7 | 85.0 |
| Unfloated_____percent__ | 32.5 | 56.25 | 32.75 | 77.3 | 15.0 |
| Feed_____percent__ | 100.0 | 23.64 | 70.88 | 100.0 | 100.0 |

EXAMPLE 2

A sample of feed was given a preliminary desliming by washing with water, but without mechanical agitation, which removed most of the free slimes, after which it was treated as in Example No. 1, except that only 2 lbs. of "La Retarder" with 2 lbs. of oil were used per ton of dry feed present. The results were as follows:

*Results, Example 2*

| Products | Weight | Assays | | Distribution | |
|---|---|---|---|---|---|
| | | B. P. L. | Insol. silica | B. P. L. | Insol. |
| Floated_____percent__ | 55.6 | 2.18 | 96.48 | 4.7 | 78.3 |
| Unfloated_____percent__ | 44.4 | 55.20 | 33.50 | 95.3 | 21.7 |
| Feed_____percent__ | 100.0 | 25.77 | 68.49 | 100.0 | 100.0 |

By comparison of Examples 1 and 2, it will be seen that substantially the same quantitative separation was effected in Example 2 with half the amount of cationic reagent used in Example 1, as a result of merely removing the free slimes by washing with water.

My discovery, however, can be most advantageously applied if carried out in accordance with the following steps:

1. Preliminary mechanical agitation of the feed of such a nature as to polish the particles and thereby break down into slime any soft, easily slimed constituents which would later break down in handling and prevent an economical separation.
2. Desliming the polished material by washing with water.
3. Agitating the relatively slime-free feed in a thick pulp in water, with an emulsion of water, petroleum fuel oil and any of the aforementioned promoters for silica.
4. Subjecting the conditioned pulp to a means of separation whereby a portion containing the bulk of the quartz is floated in and on water and collected separately from the portion containing the bulk of the phosphate.
5. Reconditioning the unfloated constituents with more of the same reagents as those used in step 3.
6. Subjecting the reconditioned material to a means of separation as in step 4.

Steps 5 and 6 may be unnecessary if a sufficient separation can be effected without them, or they may be repeated as often as necessary to secure such a separation.

The following are examples of the operation of my preferred process:

EXAMPLE 3

A sample of feed was churned in a mechanical agitator until the easily slimed constituents were broken down into slime. The slimes were then washed out with water and the cleaned pulp agitated with an emulsion in water of 4 lbs. of petroleum fuel oil and 1 lb. of "La Retarder," both per ton of dry feed present. This conditioned pulp was then fed over a Deister-Overstrom shaking table, and the floated portion collected separately from the remainder.

*Results, Example 3*

| Products | Weight | Assays | | Distribution | |
|---|---|---|---|---|---|
| | | B. P. L. | Insol. silica | B. P. L. | Insol. |
| Floated_____percent__ | 77.9 | 4.59 | 93.17 | 18.0 | 96.7 |
| Unfloated_____percent__ | 22.1 | 73.78 | 11.39 | 82.0 | 3.3 |
| Feed_____percent__ | 100.0 | 19.88 | 75.07 | 100.0 | 100.0 |

By comparison of Examples 2 and 3, it will be seen that the removal of substantially all of the slimes by mechanical agitation (Example 3) as compared with the removal of free slimes without preliminary agitation (Example 2), that the percentage of BPL in the unfloated products increased from 55.20 to 73.78, and with a reduction of 50% in the cationic reagent used.

It has been discovered that if the separation is effected in two steps, either on shaking tables or by froth flotation, by reconditioning the unfloated material, that a better separation can be effected with a less amount of the cationic reagent, as shown by the following examples:

EXAMPLE 4

A sample of feed was freed of slimes as in Example 3. The cleaned pulp was then agitated with an emulsion in water of .6 lb. of "Sapamine KW" and 4 lbs. of petroleum fuel oil, both per ton of dry feed present, and separated as in Example 3.

*Results, Example 4*

| Products | Weight | Assays | | Distribution | |
|---|---|---|---|---|---|
| | | B. P. L. | Insol. silica | B. P. L. | Insol. |
| Floated_____percent__ | 79.5 | 8.92 | 87.98 | 39.8 | 90.5 |
| Unfloated_____percent__ | 20.5 | 52.22 | 35.71 | 60.2 | 9.5 |
| Feed_____percent__ | 100.0 | 17.80 | 77.27 | 100.0 | 100.0 |

EXAMPLE 5

A sample of feed was freed of slimes as in Example 4. The cleaned pulp was then agitated with an emulsion in water of .25 lb. of Sapamine KW and 4 lbs. petroleum fuel oil, both per ton of dry feed present. The conditioned pulp was then fed over a Deister-Overstrom shaking table. The unfloated material was then reconditioned with enough more reagents prepared as above to bring the total Sapamine KW used to .3 lb. and the oil to 5 lbs. per ton of dry feed originally present. The floated portion from the second separation was added to the floated portion from the first separation for analysis.

*Results, Example 5*

| Products | Weight | Assays | | Distribution | |
|---|---|---|---|---|---|
| | | B. P. L. | Insol. silica | B. P. L. | Insol. silica |
| Floated_____percent__ | 77.4 | 3.80 | 94.28 | 14.5 | 97.9 |
| Unfloated_____percent__ | 22.6 | 77.07 | 6.86 | 85.5 | 2.1 |
| Feed_____percent__ | 100.0 | 20.36 | 74.45 | 100.0 | 100.0 |

By comparison of Examples 4 and 5, it will be seen that the material can be treated in two steps using a less total amount of cationic reagents and with a greater percentage recovery of B. P. L. and a higher grade product.

As indicating the effectiveness of froth flotation after desliming following mechanical agitation, the following examples may be given by way of illustration:

EXAMPLE 6

A sample of the feed was freed of slimes as in Example 3. The cleaned pulp was then agitated with an emulsion in water of .28 lb. of Sapamine KW, and 3.8 lbs. of petroleum fuel oil. The conditioned pulp was then separated in a froth flotation cell with the addition of .2 lb. of du Pont's B-23 frother. The separation was complete in about 3 minutes.

Results, Example 6

| Product | Weight | Assays | | Distribution | |
|---|---|---|---|---|---|
| | | B. P. L. | Insol. silica | B. P. L. | Insol. silica |
| Floated_____percent__ | 75.7 | 4.65 | 93.54 | 16.2 | 97.0 |
| Unfloated_____percent__ | 24.3 | 75.02 | 9.13 | 83.8 | 3.0 |
| Feed_____percent__ | 100.0 | 21.76 | 73.02 | 100.0 | 100.0 |

As indicating that a cationic reagent alone will float quartz from phosphate, the following example may be given by way of illustration:

EXAMPLE 7

A sample of the debris was ground wet to pass a 65 mesh sieve, deslimed as in Example 3, agitated in a pulp in water with .8 lb. of du Pont's DP 243 per ton of dry feed present. The conditioned pulp was then separated by froth flotation as in Example 6.

Results, Example 7

| Product | Weight | Assays | | Distribution | |
|---|---|---|---|---|---|
| | | B. P. L. | Insol. silica | B. P. L. | Insol. silica |
| Floated_____percent__ | 69.5 | 10.05 | 86.80 | 24.8 | 97.4 |
| Unfloated_____percent__ | 30.5 | 69.00 | 5.39 | 75.2 | 2.6 |
| Feed_____percent__ | 100.0 | 28.00 | 61.94 | 100.0 | 100.0 |

This example shows the efficiency of the cationic reagent alone when the raw material is sufficiently fine.

The mesh limitations when using a cationic reagent supplemented with the oil are approximately through 20 mesh and on 100 mesh. Quartz coarser than 20 mesh is likely to remain unfloated and phosphate finer than 100 mesh is likely to float with the quartz.

In prior processes for selectively floating one of the ingredients in an aqueous phosphatic pulp, the pulp has been either acidic or basic, with a definite pH range, in order that the added reagent might function to render one of the materials flotatable. In my process, the pulp is neutral and the added selective agent is also neutral. This dispenses with the necessity of closely controlling the pH of the pulp. Furthermore, prior processes have necessitated, in addition to the selecting agent, an activating agent therefor which affects the pH of the pulp. My process operates most efficiently when the pulp is substantially neutral, i. e. with a pH of approximately 7.0.

From the above description, it will be seen that I can effect the separation of sand from phosphate particles by using a suitable cationic reagent to float off the sand, either by flotation or on a shaking table; that by using petroleum fuel oil to supplement the action of the cationic reagent, the amount of cationic reagent used can be decreased to effect the same results and a raw material of a somewhat coarser mesh can be rendered amenable to the process. In order to secure the greatest efficiency in separation it is highly desirable that the raw material be thoroughly deslimed, as described herein, before treating it with the cationic reagent.

When I refer to separation by flotation of the quartz herein, I mean floating off the quartz from the phosphate in water, either in a froth flotation cell or on a shaking table, or the like.

It is to be understood that the above description and examples are by way of illustration and not of limitation, and that the scope of the invention is to be determined by the appended claims.

What I claim is:

1. A method of beneficiating phosphate ore by flotation of a silica containing concentrate therefrom which comprises subjecting phosphate rock to a preliminary desliming operation to separate primary slime, polishing the deslimed material to remove the secondary slime forming the surfaces of the phosphate particles, desliming the polished material and subjecting this deslimed material to froth flotation in the presence of a promoter for silica.

2. In the method of removing quartz from a deslimed washery waste phosphate aggregate using a cationic reagent which permits the quartz to be floated from the phosphate in an aqueous pulp, the improvement which comprises agitating the aggregate to break down slimable material, and thereafter subjecting the aggregate to a second desliming before conditioning the aggregate for separation.

3. The method of removing quartz from phosphate in phosphate matrix, which comprises subjecting the phosphate matrix to washing and sizing operations to produce a material comprising particles of a size between about 20 and 100 mesh containing quartz and phosphate particles from which free or primary slime has been removed, subjecting the phosphatic material thus obtained to agitation to remove slimable material or secondary slimes adhering to the phosphate particles thereof, separating the freed slimable material, forming a pulp comprising the phosphatic material from which the freed slimable material has been separated and a cationic reagent, and subjecting the pulp thus formed to a treatment dependent for separation upon altered characteristics of the surface of the particles, to cause the particles of quartz to be separated from the phosphate particles.

4. The method of removing quartz from phosphate in phosphate matrix, which comprises subjecting the phosphate matrix to washing and sizing operations to produce a material comprising particles of a size between about 20 and 100 mesh containing quartz and phosphate particles from which free or primary slime has been removed, subjecting the phosphatic material thus obtained to agitation to remove slimable material or secondary slimes adhering to the phosphate particles thereof, separating the freed slimable material, forming a pulp comprising the phosphatic material from which the freed slimable material has been separated, petroleum oil and a cationic reagent, and subjecting the pulp thus formed to a treatment dependent for separation upon altered characteristics of the surface of the particles, to cause the particles of quartz to be separated from the phosphate particles.

5. The method of beneficiating phosphate ore which comprises subjecting phosphate matrix to washing and sizing operations to produce a phosphatic material comprising particles of a size between about 20 and 100 mesh and containing quartz and phosphate particles from which free or primary slime has been removed, subjecting the phosphatic material thus obtained to agitation to remove slimable material or secondary slimes adhering to the phosphate particles thereof, separating the freed slimable material, forming a pulp comprising the phosphatic material from which the freed slimable material has been separated, petroleum oil and a cationic reagent, and subjecting the pulp thus formed to treatment in a froth-flotation cell to cause quartz particles to be floated from the phosphate particles.

6. The method of beneficiating phosphate ore which comprises subjecting phosphate matrix to washing and sizing operations to produce a phosphatic material comprising particles of a size between about 20 and 100 mesh and containing quartz and phosphate particles from which free or primary slime has been removed, subjecting the phosphatic material thus obtained to agitation to remove slimable material or secondary slimes adhering to the phosphate particles thereof, separating the freed slimable material, forming a pulp comprising the phosphatic material from which the freed slimable material has been separated, petroleum oil and a cationic reagent, and subjecting the pulp thus formed to flotation on a shaking table to cause particles of quartz to be floated from the phosphate particles.

7. A process of separating silicious matter from non-metallic ores by froth flotation which comprises subjecting a deslimed pulp of the ore containing not more than 1% of slimes to froth flotation in the presence of a cation active flotation collector for the silicious matter.

8. A process of separating silicious matter from phosphate rock by froth flotation which comprises subjecting a deslimed pulp of the ore containing not more than 1% of slimes to froth flotation in the presence of a cation active flotation collector for the silicious matter.

9. A process according to claim 8 in which the phosphate flotation feed contains not more than about .5% slimes.

10. A process according to claim 8 in which the cation active flotation reagent is an amine.

11. A process according to claim 8 in which the cation active flotation reagent is lauryl amine hydrochloride.

12. In a process of separating acidic silicious gangue from slimy ores containing the same by means of froth flotation in the presence of cationic reagents, the improvement which comprises the steps of desliming the flotation feed until it contains not more than about .5% slimes and subjecting said deslimed flotation feed to the froth flotation operation.

13. In a process of separating acidic silicious gangue from slimy phosphate rock containing the same by means of froth flotation in the presence of cationic active flotation reagents, the improvement which comprises the steps of desliming the flotation feed until it contains not more than about .5% slimes and subjecting said deslimed flotation feed to the froth flotation operation.

EDWARD J. ELLIS.